(12) United States Patent
Nishimura

(10) Patent No.: US 6,493,360 B1
(45) Date of Patent: Dec. 10, 2002

(54) RECEPTION SYNCHRONIZATION CIRCUIT, RECEIVER USING THE SAME, AND DIGITAL COMMUNICATION SYSTEM

(75) Inventor: Osami Nishimura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/208,552

(22) Filed: Dec. 9, 1998

(30) Foreign Application Priority Data

Dec. 9, 1997 (JP) .............................................. 9-338669

(51) Int. Cl.[7] .............................. H04J 3/08; H04J 1/00; H04H 1/04; H04L 27/06; H04L 7/00
(52) U.S. Cl. ....................... 370/514; 370/326; 370/486; 370/535; 375/342; 375/365; 375/368
(58) Field of Search ................................. 370/514, 535, 370/542, 544, 310, 326, 324, 323, 322; 375/354, 356, 364, 371, 343, 365, 368

(56) References Cited

U.S. PATENT DOCUMENTS

| | | | | |
|---|---|---|---|---|
| 5,016,206 A | * | 5/1991 | Shinonaga | 364/715.11 |
| 5,414,711 A | * | 5/1995 | Okada et al. | 371/5.1 |
| 5,524,127 A | * | 6/1996 | Petranovich | 375/368 |
| 5,550,833 A | * | 8/1996 | Fujisawa | 370/105.4 |
| 5,598,429 A | | 1/1997 | Marshall | 375/210 |
| 5,619,507 A | | 4/1997 | Tsuda | 370/350 |
| 5,666,366 A | * | 9/1997 | Malek et al. | 370/505 |
| 5,784,368 A | * | 7/1998 | Weigand et al. | 370/310 |
| 5,867,490 A | * | 2/1999 | Campanella | 370/326 |
| 5,933,053 A | * | 8/1999 | Iemura | 329/311 |
| 6,061,406 A | * | 5/2000 | Carson et al. | 375/260 |
| 6,088,411 A | * | 7/2000 | Powierski et al. | 375/364 |
| 6,134,286 A | * | 10/2000 | Chennakeshu et al. | 375/365 |

FOREIGN PATENT DOCUMENTS

| | | |
|---|---|---|
| JP | 63-204937 | 8/1988 |
| JP | 346429 | 7/1989 |
| JP | 370226 | 8/1989 |
| JP | 1256232 | 10/1989 |
| JP | 1-309431 | 12/1989 |
| JP | 3-52423 | 3/1991 |
| JP | 5-336097 | 12/1993 |
| JP | 7-501431 | 2/1995 |
| JP | 8-51330 | 2/1996 |
| JP | 9-18404 | 1/1997 |
| JP | 9-116483 | 5/1997 |
| JP | 9-135193 | 5/1997 |

OTHER PUBLICATIONS

Japanese Office Action issued Nov. 22, 1999 in a related application and English translation of relevant portions.

* cited by examiner

Primary Examiner—Wellington Chin
Assistant Examiner—M. Phan
(74) Attorney, Agent, or Firm—Dickstein, Shapiro, Morin & Oshinsky, LLP.

(57) ABSTRACT

A reception synchronization circuit for receiving a unique word transmitted in a predetermined digital pattern. A detection circuit detects the reception electric field intensity as received power. A UW correlation judgment circuit detects the unique word (hereinafter referred to as "UW") and takes a correlation between the unique word thus detected and a predetermined digital pattern. A memory stores two or more threshold values for the movement average. After the two or more threshold values and the movement average are compared with each other, the correlation is taken by the UW correlation judgment circuit when the movement average is larger than the minimum values of the two or more threshold values.

20 Claims, 9 Drawing Sheets

DATA FORMAT OF SIGNAL

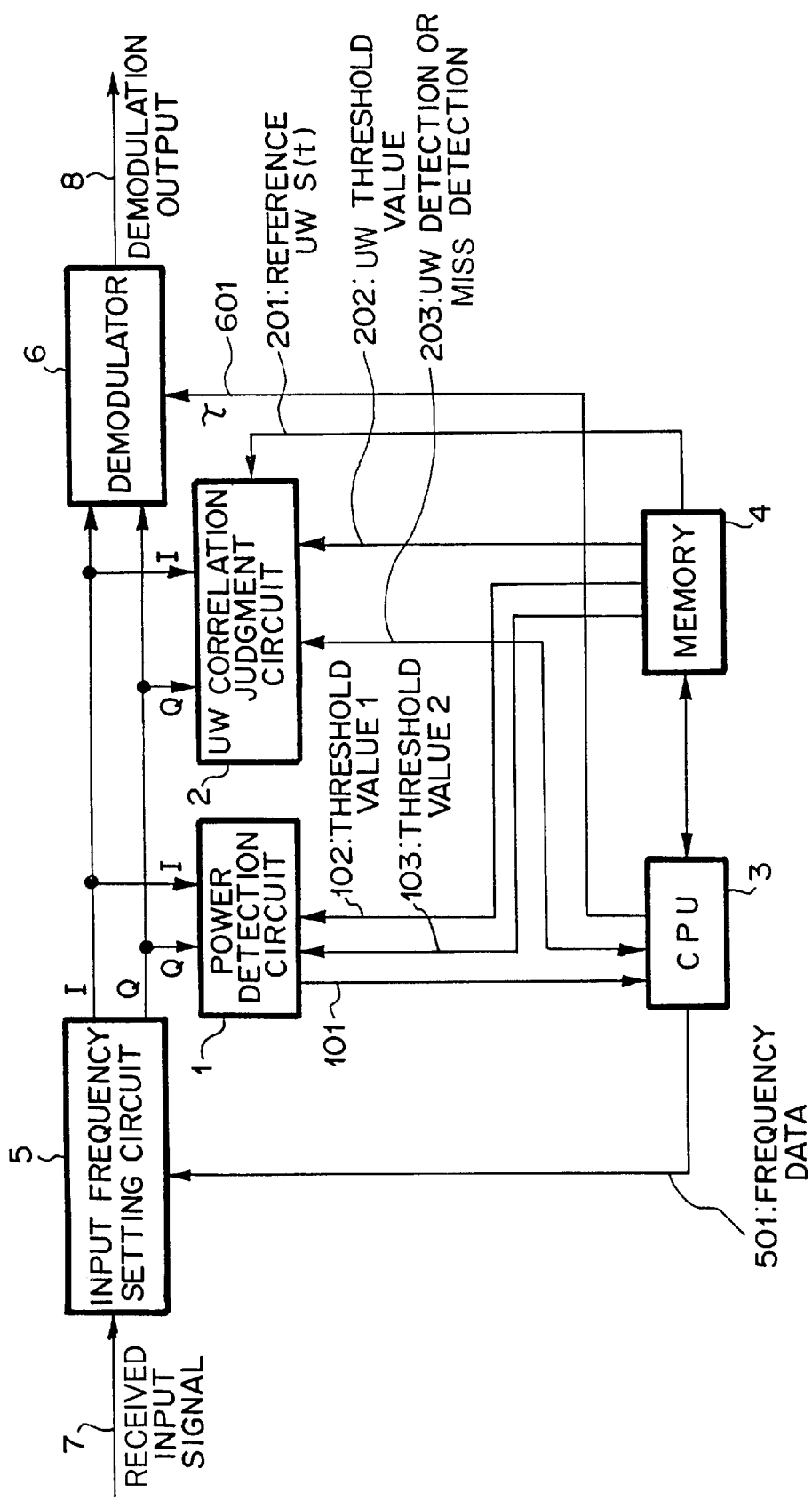

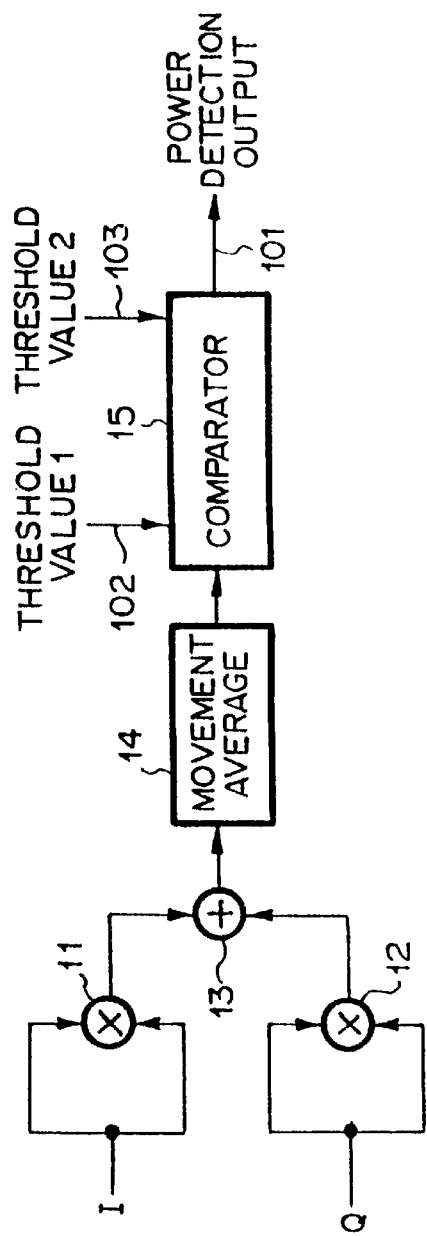
F I G. 4A
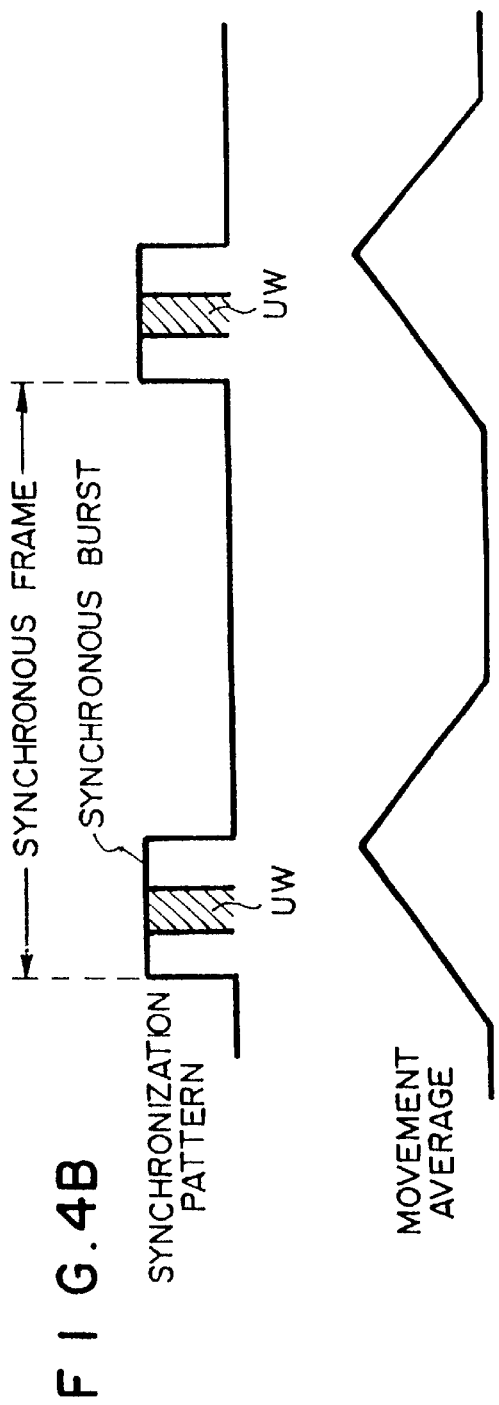
F I G. 4B

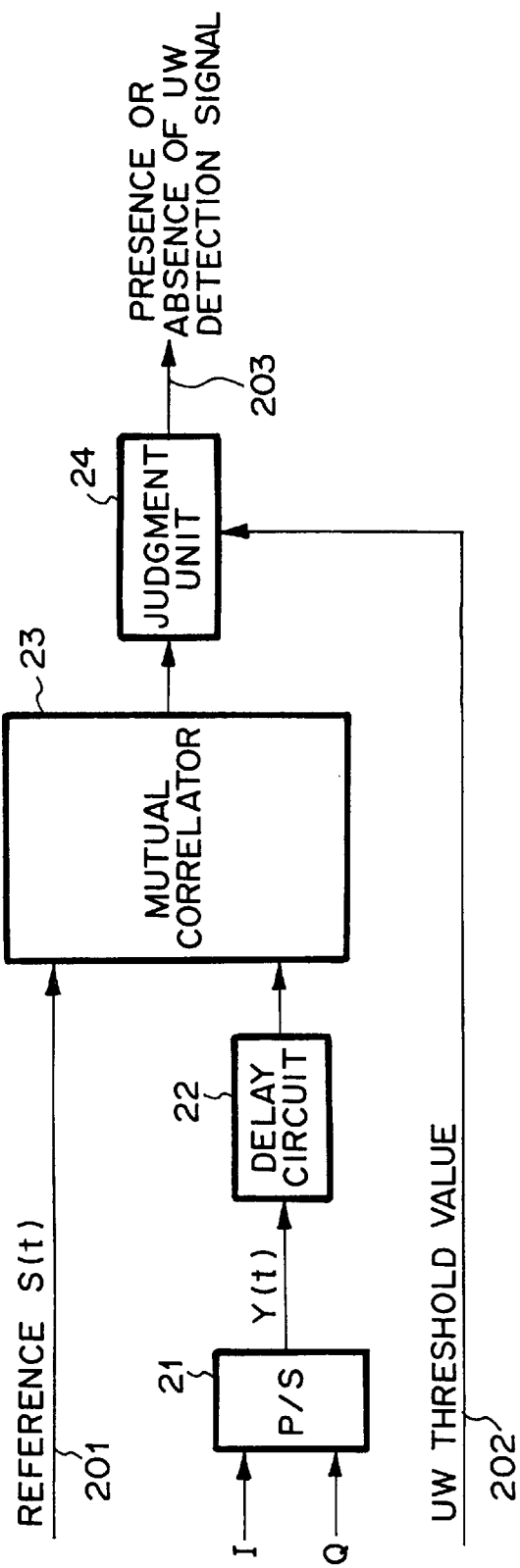
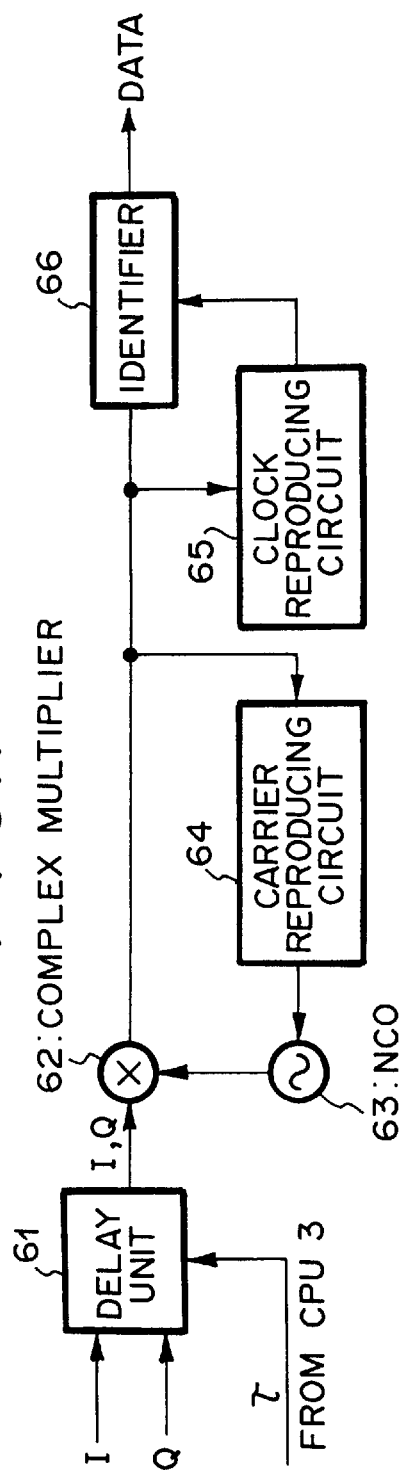

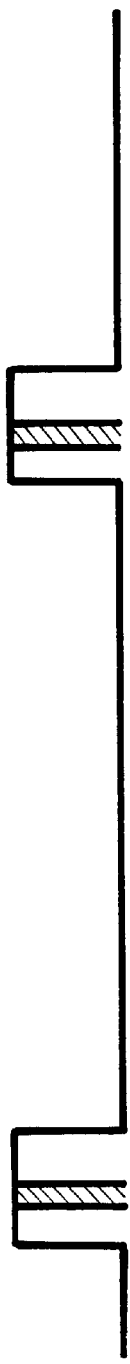
FIG.9A
FIG.9B THRESHOLD VALUE 1 2
FIG.9C THRESHOLD VALUE 1 2
FIG.9D THRESHOLD VALUE 1 2
FIG.9E THRESHOLD VALUE 1 2

RECEPTION SYNCHRONIZATION CIRCUIT, RECEIVER USING THE SAME, AND DIGITAL COMMUNICATION SYSTEM

BACKGROUND OF THE INVENTION

1. Field of the Invention

The present invention relates to a reception synchronization circuit, a reception synchronization method and a receiver, and particularly to a reception synchronization circuit, a reception synchronization method, a receiver and a digital communication system for receiving a synchronous word or a unique word (hereinafter referred to as "UW") which is used to establish synchronization and transmitted in a predetermined digital a pattern for transmission of digital data in a satellite communication and a mobile communication, for example, ICO system (Inmarsat-P Communication system), Iridium system, Global Star system, CDMAOne system, GSM (Global System for Mobile Communication) and W-CDMA system.

2. Description of the Related Art

Japanese Laid-open Patent Application No. Hei-1-256232 (prior art 1) discloses a synchronous word (UW) detection system. The synchronous word detection system comprises a line quality monitoring circuit for monitoring the quality of a line at any time with a controller of a TDMA (Time Division Multiple Access) satellite communication system and outputting line quality information at a predetermined time interval; a permission error number setting circuit which receives the line quality information and search/narrow mode information representing a reception synchronization process in the TDMA satellite communication system to make the permission error number (threshold value $\epsilon$) of a synchronous word pattern of the satellite circuit variable in accordance with the quality of the line at a predetermined time interval and output it; a threshold value correlation detection circuit which receives the variable permission error from the permissible error number setting circuit, compares reception input data with a predetermined synchronous word pattern to establishment a correlation therebetween, and then outputting a coincidence pulse on the basis of an indicated permission error number $\epsilon$; a storage circuit containing hardware information to exchange the permission error number setting circuit and the threshold value correlation detection circuit with each other on a real-time basis with the search/narrow information and the line quality information as an input address; and a logic circuit for performing AND between the coincidence pulse output from the threshold value correlation detection circuit and an aperture signal occurring at a normal position of a reception reference burst and outputting a synchronization detection pulse.

With the synchronous word system thus constructed, the UW detection can be efficiently performed on a real-time basis, and particularly it can perform the detection of UW efficiently when applied to an earth station having a compact-size antenna (1 to 2 m level) or an earth station in which deterioration of C/N due to attenuation of a rainfall remarkably appears.

Japanese Laid-open Patent Application No. Hei-3-46429 (prior art 2) discloses a unique word detection circuit apparatus including a code error rate measuring circuit for measuring the code error rate of reception data input and outputting the code error rate thus measured; a correlation detection threshold value calculation circuit for calculating and outputting the correlation detection threshold value ($\epsilon$) corresponding to the code error rate; a microprocessor for outputting the correlation detection threshold value ($\epsilon$) with a bus signal; and a unique word detection circuit for judging detection or miss detection of the correlation detection threshold value ($\epsilon$) output from the microprocessor and the reception unique word and then outputting a unique word detection signal only when the unique word is detected.

With the unique word detection circuit apparatus thus constructed, loss of a unique word due to temporary deterioration of a code error rate, loss of reception data which is appendant to the loss of the unique word, and out-of-synchronization of a line can be prevented, thereby enhancing synchronization precision and reliability.

Japanese Laid-open Patent Application No. Hei-3-70226 (prior art 3) discloses maximum value detection selection means for selecting the reception signal having the maximum envelope level from reception signals which are received by plural antennas; a limiter circuit for dividing the reception signal having the maximum enveloped level thus selected by the maximum envelope level to normalize the reception signal having the maximum envelope level and set the envelope level to a predetermined value; means for calculating a complex correlation coefficient between the normalized reception signal and the complex signal corresponding to a specific frame synchronization pattern (UW); and comparison means for comparing the complex correlation coefficient with any threshold value level, wherein a frame synchronization detection circuit judges the reception signal as a frame synchronization pattern (UW) when the complex correlation coefficient is larger than the threshold value level.

Accordingly, in a reception apparatus using a diversity reception system, the effect of multi-path fading can be removed, and the detection precision of the frame synchronization pattern can be enhanced, so that there can be achieved a digital ground mobile radio (wireless) communication system having high reception precision.

Further, Japanese Laid-open Patent Application No. Hei-5-167630 (prior art 4) discloses a unique word detector including: a first delay detector for receiving as an input signal a signal obtained by subjecting quasi-synchronization and demodulation to a reception signal in which a unique word is inserted, and detecting the delay of the input signal; a unique word generator for generating a complex conjugate value of the unique word; a second delay detector for detecting the delay of the output of the unique word generator; a mutual correlator for taking a mutual correlation between the first and second delay detectors; and a level detector for comparing the output of the mutual correlator with a predetermined threshold value to detect the maximum value thereof.

With the unique word detector thus constructed, the input signal is subjected to the delay detection by the first delay detector to remove a frequency offset therefrom, and then input to the mutual correlator while a frequency offset is removed therefrom. Therefore, even when an input signal has large frequency instability, it is unnecessary to arrange many mutual correlators in parallel for use unlike the prior art, and thus the circuit scale can be greatly reduced. In addition, only one input signal is supplied to the level detector, so that the error detection probability can be reduced.

However, in the prior arts 1 to 4, the detection means of UW itself is shown, and it is applicable to a case where a received status is surely stable. However, when the received status is unstable, an error detection state occurs in UW itself, and thus UW detection which takes no consideration into the received status is little accurately performed. Further, a predetermined time is needed to detect the correlation of UW, and when the correlation of UW is taken although the received status is bad, time is merely wasted.

In the prior art 4, the level detection is performed by the quasi-synchronized and modulated signal of the reception signal and the unique word generator for generating the complex conjugate of UW. In this prior art, the level detection is accurate, however, the relationship between the level detection and the detection of UW is not clarified.

That is, when a reception frequency at which a reception signal exists is not known at an initial stage, the reception electric field intensity of the reception signal, that is, the reception power is first detected in order to establish an early synchronization between the reception frequency and the clock timing. At this time, in the case where the detection level of the reception power is judged on the basis of only one threshold value, the reception power is frequently judged as a noise if the threshold value is low, and thus erroneous detection frequently occurs. On the other hand, if the threshold value is high, the detection of the reception signal is missed. When the reception electric field intensity, that is, the detection level of the reception power is low, the probability that the detection error is increased is high, and thus it has been still required to perform accurate UW detection with a simple construction.

SUMMARY OF THE INVENTION

Therefore, an object of the present invention is to reduce the noise error detection and the signal miss detection by preparing one type or two or more types of threshold values for a movement average detected and calculated on the basis of received power and using an improved judgment algorithm.

Further, another object of the present invention is to enable adaptive controls in various communication states by storing various past detection situations to feed them back to the setting of a threshold value.

Still further, another object of the present invention is to keep an early realization of synchronization establishment by achieving a retrial of a maximum UW measurement.

In order to attain the above objects, according to a first aspect of the present invention, a reception synchronization circuit for receiving a unique word transmitted in a predetermined digital pattern is characterized by comprising: a detection circuit for outputting a reception movement average of a received signal; a memory for storing at least one threshold value for the movement average; comparison means for comparing the reception movement average and the threshold value of the movement average; and an UW correlation judgment circuit for detecting the unique word (hereinafter referred to as "UW") when the reception movement average is higher than the threshold value of the movement average, and taking a correlation between the detected unique word and a predetermined digital pattern.

Further, according to a second aspect of the present invention, a reception synchronization circuit for receiving a unique word transmitted in a predetermined digital pattern is characterized by comprising: a detection circuit for detecting the received power of a received signal and outputting a movement average; a UW correlation judgment circuit for detecting the unique word (hereinafter referred to as "UW") and taking a correlation between the unique word thus detected and a predetermined digital pattern; and a memory for storing two or more threshold values for the movement average, wherein after the two or more threshold values and the movement average are compared with each other, the correlation is taken by the UW correlation judgment circuit when the movement average is larger than the minimum values of the two or more threshold values.

In the above reception synchronization circuit, when the movement average is larger than the maximum threshold value of the two or more threshold values, the correlation is taken by the UW correlation judgment circuit. Further, when the movement average is smaller than the minimum threshold value of the two or more threshold values, the minimum threshold value is increased.

According to a third aspect of the present invention, a receiver according to the present performs data detection based on the TDMA system by using the above reception synchronization circuit.

According to a fourth aspect of the present invention, a reception synchronization method for receiving a unique word (hereinafter referred to as "UW") transmitted in a predetermined digital pattern is characterized by comprising the steps of: detecting the received power of a received signal; calculating the mean square of the received power and outputting a reception movement average; reading out from a memory the minimum threshold value and the maximum threshold value which are stored in the memory in advance; comparing the reception movement average with the minimum threshold value; detecting the UW when the reception movement average is larger than the minimum threshold value; and taking a correlation between the UW and the predetermined digital pattern.

In the above reception synchronization method, when the reception movement average is judged to be smaller than the minimum threshold value as a result of the comparison between the reception movement average and the minimum threshold value, the minimum threshold value is reduced to search a next reception channel. Further, in the above reception synchronization method, when the reception movement average is judged to be larger than the minimum threshold value and smaller than the maximum threshold value as a result of the comparison of the reception movement average, the minimum threshold value and the maximum threshold value, the maximum threshold value is reduced to perform a correlation calculation between the received signal and the UW.

According to a fifth aspect of the present invention, a digital communication system according to the present invention performs synchronization by using the above reception synchronization method.

Specifically, the signal detection and synchronization are established by the power detection and the UW (Unique Word) correlation. At this time, the judgment of the detection is performed on the basis of the threshold value, and two kinds of threshold values are prepared for the power detection to enhance the early search and the detection probability. Further, the past results are beforehand stored to suitably renew the threshold value.

BRIEF DESCRIPTION OF THE DRAWINGS

FIG. 2 is a block diagram showing the construction of an embodiment of the present invention;

FIG. 4 is a block diagram showing a reception power detection circuit according to the embodiment of the present invention;

FIG. 6 is a block diagram showing a UW correlation judgment circuit according to the embodiment of the present invention;

FIG. 7 is a block diagram showing a decoder according to the embodiment of the present invention;

FIG. 9 is a waveform diagram showing the embodiment of the present invention;

DETAILED DESCRIPTION OF THE PREFERRED EMBODIMENTS

Preferred embodiments according to the prevention invention will be described hereunder with reference to the accompanying drawings.

First Embodiment

A first embodiment according to the present invention will be described hereunder with reference to the accompany drawings.

Figure 1:
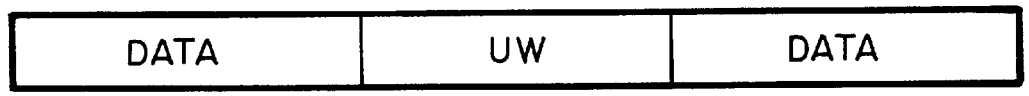
FIG. 1 is a diagram showing a signal construction of a data format according to the present invention.

FIG. 1 shows the data format of a synchronous burst containing a unique word (hereinafter referred to as "UW") used for TDMA (Time Division Multiple Access) system. The synchronous burst can be received at a synchronous frame interval by demodulating a received signal of a specific control channel. The synchronous burst is formatted by control data, UW formed of a predetermined digital pattern and control data. However, the format of the synchronous burst containing UW is not limited to the above format, and other formats may be adopted.

FIG. 2 is a block diagram showing the construction of a reception synchronization circuit according to the first embodiment.

In a reception synchronization circuit shown in FIG. 2, reference numeral 1 represents a power detection circuit of a received signal 7. Reference numeral 2 represents a UW correlation judgment circuit of UW of the received signal. Reference numeral 3 represents a control CPU for controlling the overall reception synchronization circuit. Reference numeral 4 represents a rewritable memory for storing plural threshold values for a movement average which is detected and calculated on the basis of the received power and provided on lines 102, 103, and a correlation detection threshold value (ε) used in the UW correlation judgment circuit. Reference numeral 5 represents an input frequency setting circuit for demodulating a received input signal and outputting orthogonal signals I and Q, which contains a high-frequency unit, a mixer circuit, an intermediate frequency unit, a demodulation circuit, etc. and can set the received channel. Reference numeral 6 represents a data processor for establishing synchronization on the basis of the received UW, processing the received data and outputting a demodulated signal on line 8.

According to the reception synchronization circuit thus constructed, the input frequency setting circuit sets the frequency of a local oscillation unit for the received input signal from a reception antenna (not shown) according to a received channel indicated by CPU 3, and the received signal is passed through a high-frequency amplifier, a mixer circuit, an intermediate frequency amplifying circuit and a digital signal demodulation circuit and then orthogonally demodulated and output as I, Q signals as in the case of QPSK or the like.

Figure 3:
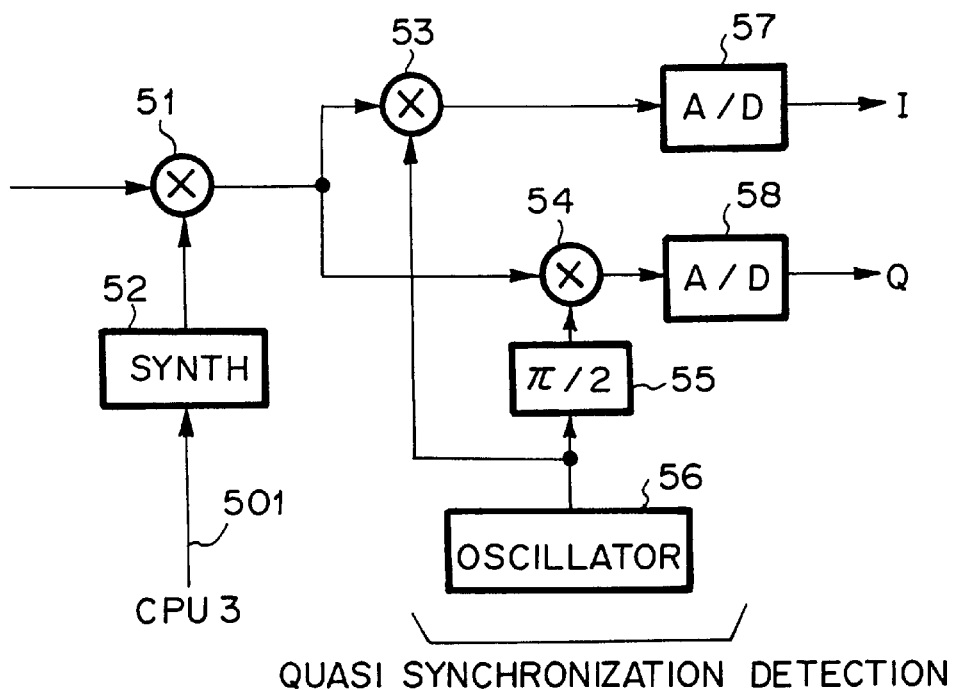
FIG. 3 is a block diagram showing an input frequency setting circuit according to an embodiment of the present invention.

FIG. 3 shows the construction of the input frequency setting circuit 5.

In FIG. 3, the high frequency signal input from the reception antenna is input through the high frequency amplifying circuit and a high frequency filter to a mixer 51, and a synthesizer 52 generates a local oscillation signal corresponding to the received frequency on the basis of a frequency setting signal 501 of the CPU 3 and inputs the local oscillation signal to the mixer 51. The mixer 51 outputs an intermediate frequency signal. The intermediate frequency signal has a frequency of about 10 MHz and demodulated by a quasi synchronization detection circuit. In the quasi synchronization detection circuit, the intermediate frequency signal is multiplied with an oscillation signal of a reference oscillator 56 in a first multiplier 53, converted to a digital signal in an A/D converter 57 and then output as an I signal. The intermediate frequency signal is multiplied with an inverted oscillation signal in a second multiplier 54, the inverts oscillation signal being output through a π/2 phase-shifter 55 for inverting the phase of the oscillation signal of the reference oscillator 56, and the converted to a digital signal in an A/D converter 58 to be outputted as a Q signal.

In the power detection circuit 1, the electric field intensity of the input received signal, that is, the received power of the received signal can be achieved by detecting the envelope level of the carrier of the intermediate frequency unit of the input frequency setting circuit 5, and in the following description, a detection circuit for the movement average shown in FIG. 4 will be described.

In FIG. 4A, the square values of I, Q signals are achieved through the multipliers 11, 12 respectively on the basis of I, Q signals which are orthogonally demodulated in the input frequency setting circuit 5, then these square values are added to each other by an adder 13 to achieve $I^2+Q^2$, and then a movement average is output by a movement average circuit 14. In a comparator 15, the movement average thus obtained is compared with threshold values 1, 2 output from the memory 4 through lines 102, 103, and the comparison result is output as a power detection output to the CPU 3 on line 101 (see also FIG. 2).

Here, FIG. 4B shows the general relationship between the synchronization pattern and the movement average.

The synchronization pattern is a synchronous burst containing UW within a periodic synchronous frame. The movement average is different in pulse form from the synchronous burst, however, it gradually increases from the detection time of the synchronous burst and gradually reduced from the extinction time of the synchronous burst. A window may be applied during the period of the synchronous burst, however, the movement average is detected as a triangular wave.

The position of the peak of the triangular wave is dependent on the digital pattern of the synchronous burst on the assumption that it has no noise component, and it is beforehand set to a position which is determined by a synchronous burst generated in the communication system. That is, it is predetermined that UW is started at a preceding position or subsequent position by several bits from the peak position of the triangular wave of the movement average, so that the start point of UW can be settled by using a substantially predetermined number of bits. Further, the movement average is compared with the threshold values 1, 2 in the comparator 15. The power of the received signal can be detected by comparing the movement average with one threshold value, and if UW is afterwards detected and correlated, it is effective for the UW correlation and detection. However, in order to perform UW detection more accurately, it is better to compare the movement average with two or more threshold values, whereby the degree of the movement average represented by the received power can be accurately detected.

Figure 5:
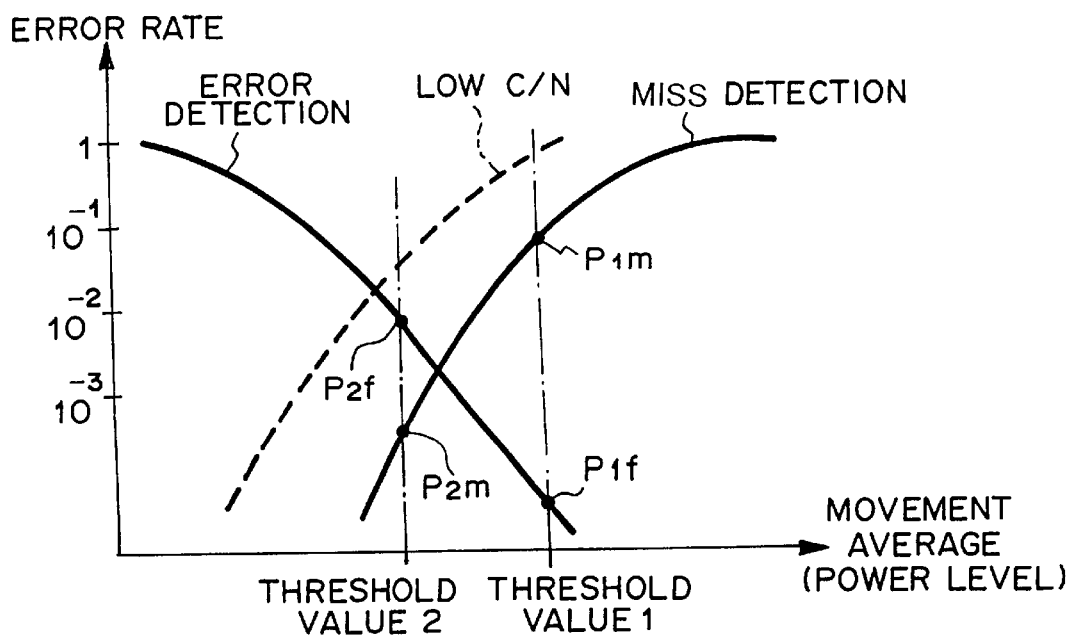
FIG. 5 is a graph showing the relationship between a movement average and an error rate used in the embodiment of the present invention.

FIG. 5 shows a graph showing the relationship between the movement average and the error rate. A miss detection line (Miss Detection) represents a characteristic when no UW is detected in-spite of presence of a received signal. In this miss detection line, the error rate of UW is a high value when the movement average is large, however, the error rate of the miss detection is low value when the movement average is small. In this case, when C/N of the received signal is low, that is, when the noise component is large (represented by a dotted line in FIG. 5), the error rate is higher than the error rate P1 m of the miss detection line when the movement average is equal to the threshold value 1. This is because the detection of the received signal is more frequently carried out due to a large noise.

Further, an error detection line (False Detection) represents a characteristic when UW is detected as an error detection although the noise component is large. When the movement average is large, the error rate of the error detection of UW is reduced. On the other hand, when the movement average is small, the error rate of the error detection of UW is increased.

FIG. 6 shows a circuit diagram of the UW correlation judgment circuit 2. In the UW correlation judgment circuit 2, the orthogonal signals I, Q are converted to a parallel/serial signal Y(t) in a P/S circuit 21, and then Y(t) is adjusted in its timing by a delay circuit 22 and input to a mutual correlator 23 to be correlated with a reference S(t) which is UW of a predetermined digital pattern of a line 201. The output of the mutual correlator 23 is compared with the correlation detection threshold value ($\epsilon$) of a line 202, and it is judged on the basis of the correlation probability whether UW is detected or not. Thereafter, the judgment result is output as a UW detection signal from a line 203. See also FIG. 2.

The decoder 6 contains so-called DEM in the data processor, and the construction thereof is shown in FIG. 7. The orthogonal signal I, Q is input to a delay unit 61 in which the mutual timings of the orthogonal signals I, Q are matched with each other by a delay time adjustment signal $\tau$ from the CPU 3 provided on line 601 (FIG. 2). In FIG. 7, the units from the delay unit 61 to an identifier 66 are illustrated as one system. However, these units are actually provided as two systems for the orthogonal signals I, Q, respectively, and only one system is illustrated in FIG. 7 for convenience's sake. The I signal or Q signal passed through the delay unit 61 is complexed-multiplied with the output of a numerical control oscillator NCO 63 by a complex multiplier 62, and the complex-multiplied I signal or Q signal is input to a carrier reproducing circuit 64 to generate a numeral control signal and input to NCO 63. Further, the I signal or Q signal is subjected to timing correction in a clock reproducing circuit BTR 65 serving as a bit timing recovery circuit, and then original transmitted data are output on the basis of the input I signal or Q signal by the identifier 66. As described above, the UW detection signal detected by the UW correlation judgment circuit 2 is input to the CPU 3, the delay time adjustment signal $\tau$ is accurately generated on the basis of the UW detection signal, and data detection can be performed with high reliability in the demodulator 6.

Next, the operation of the reception synchronization circuit described above will be described in detail with reference to the flowchart of FIG. 8 by using an example of the detection level of the movement average for a synchronous burst (a) of FIG. 9.

Figure 8:
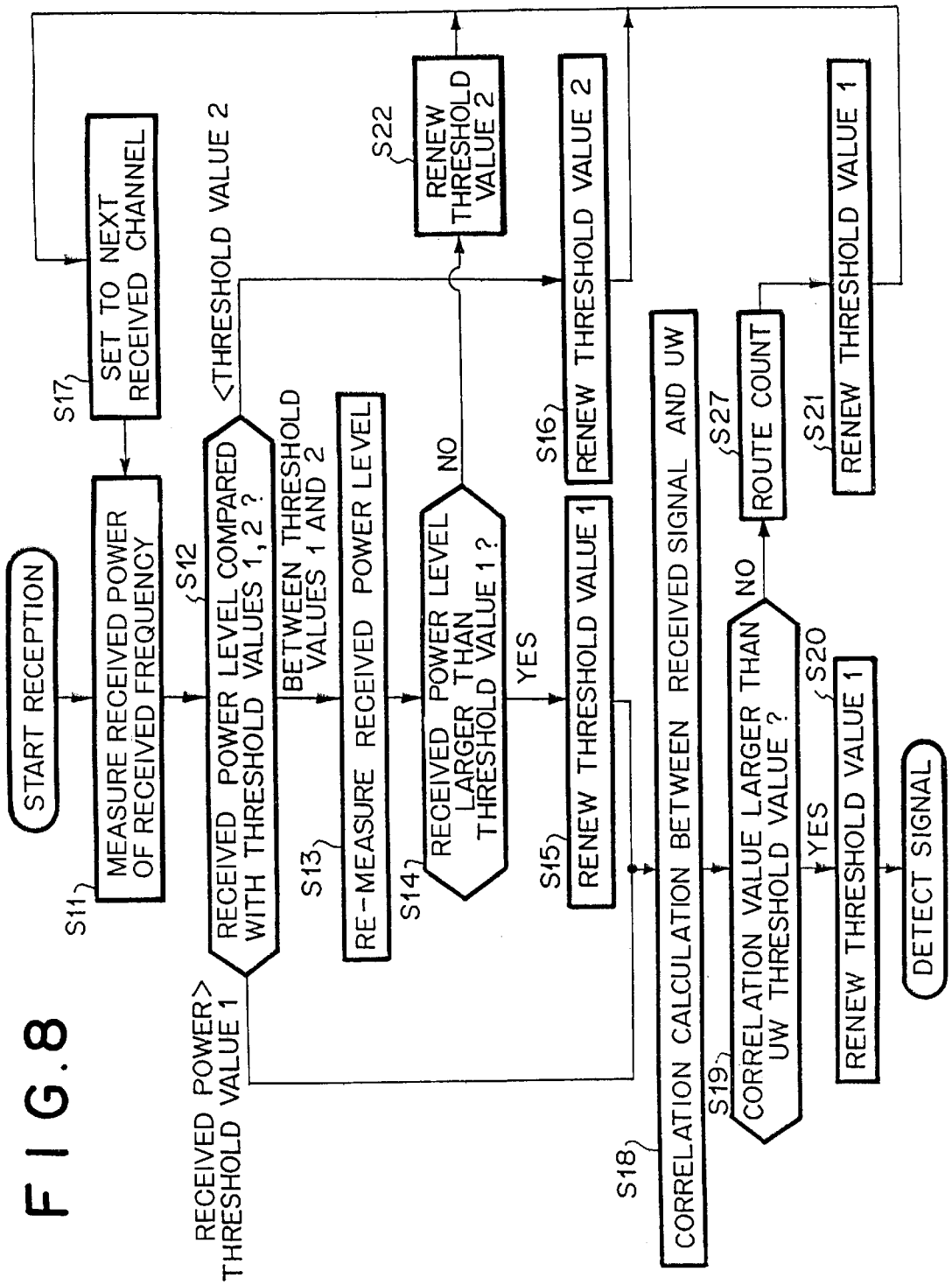
FIG. 8 is a flowchart showing the embodiment of the present invention.

In FIG. 8, the first power measurement of the received signal is performed in step 11 to calculate and detect the movement average. Subsequently, in step 12, the movement average which is the power level of the received signal is compared with a threshold value 1 and a threshold value 2. However, the threshold value 1 is set to be larger than the threshold value 2. As a result of the comparison, when it is judged that the received. power level is larger than the threshold value ((b) of FIG. 9), the processing goes to step 18 for UW detection. When it is judged that the received power level is between the threshold values 1 and 2 ((c), (d) of FIG. 9), the power measurement is performed again during the period of the second synchronous burst signal, and the power level is compared with the threshold value 2 in step 14. If the power level is larger than the threshold value 1 in step 14 ((c) of FIG. 9), the threshold value 1 is renewed to be increased in step 15, and then the processing goes to step 18 for UW detection. If the power level is smaller than the threshold value 1 in step 14 ((d) of FIG. 9), the processing goes to step 22 to renew the threshold value 2 so that the threshold value 2 is increased, and then the processing goes to step 17.

Further, if the received power level is smaller than the threshold value 2 in step 12 ((e) of FIG. 9), it is judged that no signal exists in the received channel concerned, and the threshold value 2 is renewed to be reduced in step 16. Thereafter, the processing is shifted to a next received channel frequency in step 17, and the processing returns to step 11 again to set the next received channel and start the power measurement.

For the signal for which the power level of the movement average above the threshold value 1 is detected, the correlation between UW read out from the memory 4 and UW of the received signal are temporarily calculated in step 18. In step 19, the correlation value is compared with the UW threshold value ($\epsilon$). If the correlation value is larger than the UW threshold value ($\epsilon$), the threshold value 1 and the threshold value 2 are left as they are in step 20. Thereafter, the signal data detection is performed in the data processor 6, and the processing is normally finished. This means that the correct signal is received, and the signal processing for the received data, sounds, etc. is carried out.

Next, if the UW correlation value thus received is smaller than the UW threshold value ($\epsilon$) in step 19, the route of the steps along which the processing is carried out is estimated in step 21, the threshold value 1 is increased while the threshold value 2 is left as it is, and then the processing is shifted to hopping to the next received channel in step 17.

In the above flowchart, the upper and lower limits are preset for the threshold value of the received power level, and the setting of the threshold value is adjusted so that the threshold value does not exceed the range determined by the upper and lower limits when the adaptive control is performed.

Here, the threshold value 1 of the movement average is reduced when the frequency of the miss detection is high, and it is increased when there is no miss detection and the UW correlation trends to be further higher than the UW threshold value (ε) or the frequency of the error detection is large.

Further, the threshold value 2 is increased when the frequency of the error detection is excessively high, and it is reduced when there is any miss detection or there is no error detection and the UW correlation trends to be further higher than the UW threshold value (ε). The UW threshold value (ε) is not renewed after it is set at an initial stage.

In the above flowchart, the comparison/judgment based on the past threshold values in the first power measurement and the second power measurement are performed to store the past results, whereby the threshold value can be renewed adaptively.

As described above, the threshold values 1, 2 are renewed in accordance with the movement average received and detected, so that the accuracy and the reliability of the UW detection can be enhanced.

Second Embodiment

Next, a reception synchronization circuit according to a second embodiment will be described.

Figure 10:
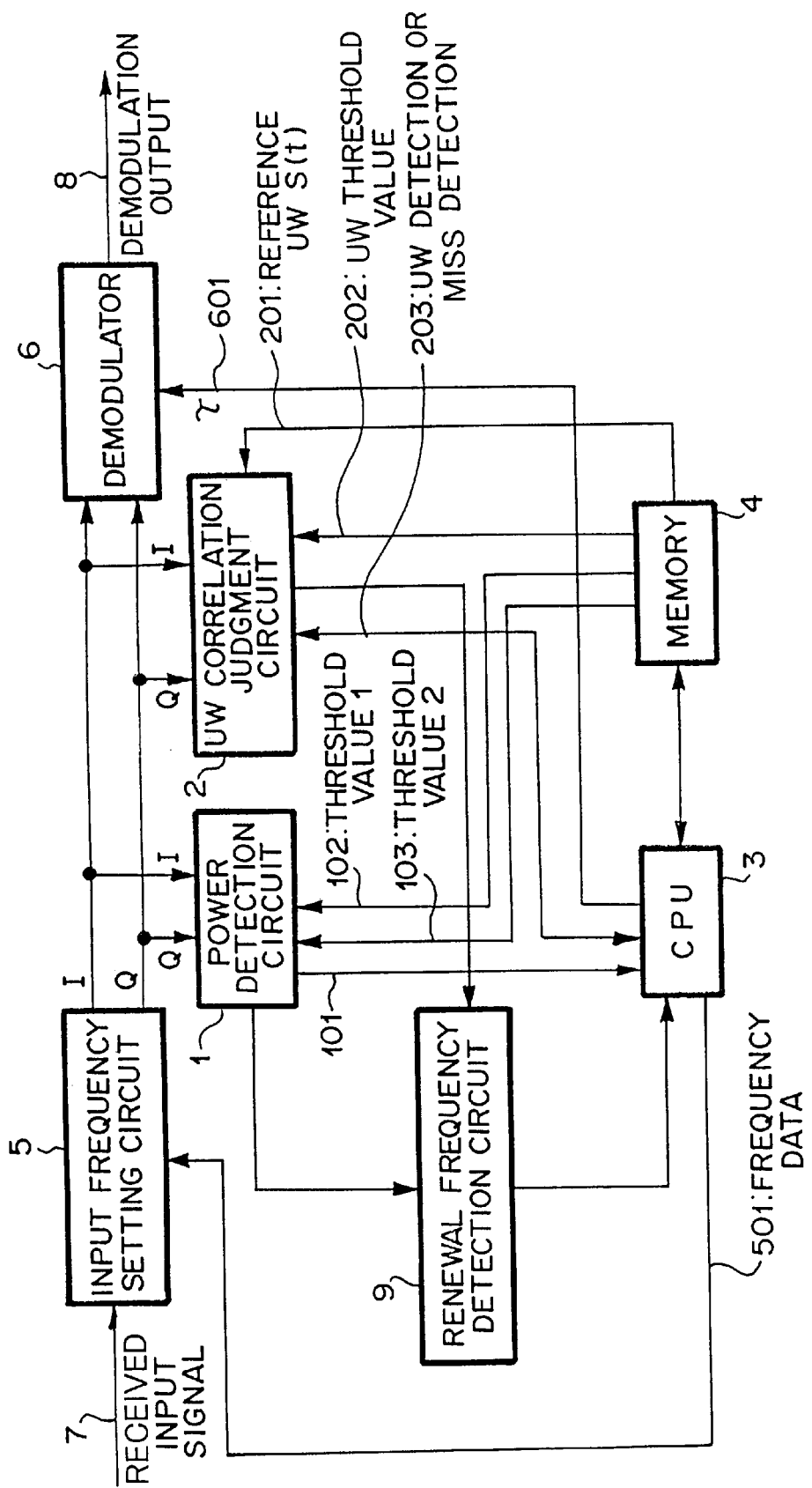
FIG. 10 is a block diagram showing the construction of the embodiment of the present invention.
Figure 11:
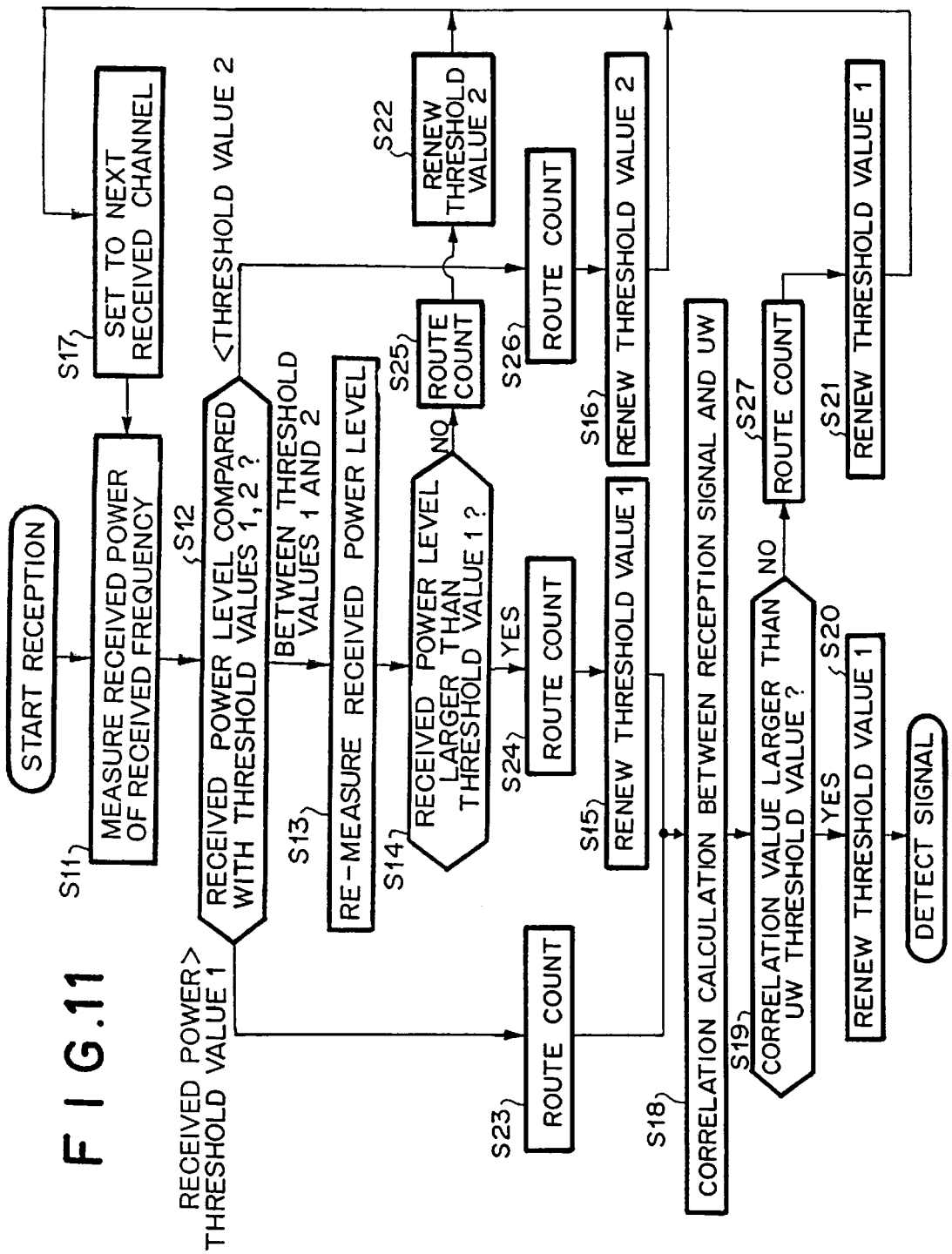
FIG. 11 is a flowchart showing the embodiment of the present invention.

FIGS. 10 and 11 are a block diagram and a flowchart of a receiver according to this embodiment. In FIG. 10, the difference from FIG. 2 resides in that a renewal frequency detection circuit 7 connected to the power detection circuit 1 and the UW correlation judgment circuit 2. Further, in the flowchart of FIG. 11, the difference from FIG. 8 resides in that each flow route contains route count steps 23 to 27, and a renewal method and a renewal step are judged when the threshold values 1, 2 are renewed.

In FIG. 10, the renewal frequency detection circuit 9 receives the difference between the threshold value 1, 2 and the received movement average from the power detection circuit 1 and the difference between the UW received from the UW correlation judgment circuit 2 and the correlation threshold value stored in the memory 4 to detect the renewal step of each threshold value 1, 2 and input the data thereof to the CPU 3. The renewal step is set in the CPU 3, the threshold value of the memory 4 is increased or reduced in the renewal step and stored in the memory 4, and finally there are provided for comparison with plural threshold values in the power detection circuit 1.

In FIG. 11, when each threshold value for the movement average is renewed, the route count 23 represents a route of a first measurement result, and it is used in renewal steps 20, 21 of the threshold value 1. The route count 24 represents a route of a second judgment result, and it is used in renewal steps 15, 20, 21. A route count 25 represents a route of a second judgment result, and it is used in a renewal step 22 of the threshold value 2. Further, it is effectively used in the renewal step for route counts 26, 27.

For example, in the case where the threshold value 21 is renewed in step 21, when the processing passes from the step 12 through the steps 23, 18, 19, it corresponds to a case where the movement average is larger than the threshold value 1, but UW cannot be normally detected in the first step of (b) of FIG. 9. Therefore, the noise component is estimated as being large, and the renewal is made to increase threshold value 1. However, when the processing passes from the step 12 through the steps 13, 14, 24, 18, 19, it corresponds to a case where the movement average is larger than the threshold value 1, but UW cannot be normally detected in the second step of (c) of FIG. 9, and thus the detection is estimated to be made due to the noise component in the second step, so that the threshold values 1 and 2 are increased, and the channel is judged to have no received signal to wait for reception of a next channel.

Further, in the case of the renewal of the threshold value in step 20, when the processing passes from the step 12 through the steps 13, 13, 24, 15 and 19, it corresponds to a case where the movement average is larger than the threshold value 1 in the second step of (c) of FIG. 9 and UW can be normally detected, and thus the renewal is made to increase the threshold value 1 and leave the threshold value 2 as it is in order to make the first detection normal.

Still further, when the received signal level is high, the processing passes through the route count 23 and UW is larger than the UW threshold value, it is effective to increase the current threshold value 1 by two steps or three steps in the renewal step 20 of the threshold value 1.

As described above, the route along which the processing passes in the route of the flowchart shown in FIG. 11 varies the renewal state of the threshold value, and thus it is effective as an optimizing method.

The gap between the threshold values 1 and 2 may be controlled so as to be larger so that the probability that there is a received signal and it is larger than the threshold value 1 and the probability that there is a received signal and it is between the threshold values 1 and 2 are constant.

Particularly, the system which is effective to each of the above embodiments uses as a received signal having UW BCCH (Broadcast control channel) signal used in a GSM terminal device or the like. However, it may be applied to various portable terminals using TDM system receiving like signals, such as a portable communication terminal, PHS (Personal Handyphone System).

In each embodiment, the estimation of the synchronization frequency and the clock timing is made on the basis of the received signal having UW. In this case, the present invention is effective even when it contains a circuit for making such an estimation in combination with other synchronizing signals such as a carrier reproducing pulse, a clock reproducing pulse or the like.

According to the present invention, the two threshold values for received power detection are provided, and the probability that the error detection of detecting a noise as a signal is carried out can be reduced by using a higher threshold value. Further, the probability that the miss detection of the received signal is carried out can be reduced by using the lower threshold value.

Further, the probability of the error detection and the miss detection can be reduced by performing the adaptive control on the threshold value on the basis of the past detection results. In addition, the total judgment frequency can be reduced, and the early establishment of the synchronization can be performed (two periods are required at maximum per channel, however, the frequency of the two-period measurement can be reduced if the threshold value is adaptively set).

Next, the correlation between the received power level and the error detection of UW will be described.

For example, when the probability that the measurement received power is larger than the threshold value 1 is represented by $(1-p1m)$ ($p1m$: probability of miss detection), the probability of the error detection at that time is represented by $p1f$, the probability that the miss detection is carried out with the threshold value 2 is represented by $p2m$ and the probability of the error detection is represented by $p2f$, the probability that the correction detection is carried out in the first step is represented by $(1-p1m)\times(1-p1f)$, and the probability that the correction detection is carried out in the second step is represented by (p1m−p2m)×(1−p1m)×(1−p1f). Therefore, the probability of the correction detection in the total of the first:
and second steps is represented as follows:

$$p1m \times (1-p1f) + (p1m-p2m) \times (1-1-p1f) = (1-p1m) \times (1-p1f) \times (1+p1m-p2m)$$

The threshold value for the received power which is the movement average optimum to the UW detection is set on the basis of this correlative relationship, whereby the optimum setting method can be established.

What is claimed is:

1. A reception synchronization circuit for receiving a unique word transmitted in a predetermined digital pattern comprising:

a detection circuit for detecting the received power of a received signal and outputting a movement average;

a UW correlation judgment circuit for detecting the unique word (hereinafter referred to as "UW") and taking a correlation between the unique word thus detected and a predetermined digital pattern; and a memory for storing two threshold values for the movement average, wherein after the two threshold values and the movement average are compared with each other, said received power is again detected when the movement average is larger than the minimum threshold value and is smaller than the maximum threshold value.

2. The reception synchronization circuit as claimed in claim 1, wherein when the movement average is greater than the maximum threshold value, the correlation is taken by said UW correlation judgement circuit.

3. The reception synchronization circuit as claimed in claim 1, wherein when the movement average is smaller than the minimum threshold value, the minimum threshold value is decreased.

4. The reception synchronization circuit as claimed in claim 1, wherein two threshold values stored in said memory are made variable.

5. The reception synchronization circuit as claimed in claim 2, wherein two threshold values stored in said memory are made variable.

6. The reception synchronization circuit as claimed in claim 3, wherein two threshold values stored in said memory are made variable.

7. A receiver which detects data based on TDMA system by using a reception synchronization circuit for receiving a unique word transmitted in a predetermined digital pattern, said reception synchronization circuit comprising:

a detection circuit for detecting the received power of a received signal and outputting a movement average;

a UW correlation judgment circuit for detecting the unique word (hereinafter referred to as "UW") and taking a correlation between the unique word thus detected and a predetermined digital pattern; and a memory for storing two threshold values for the movement average, wherein after the two threshold values and the movement average are compared with each other, the received power is detected again when the movement average is larger than the minimum threshold value and is smaller than the maximum threshold value.

8. The receiver as claimed in claim 7, wherein when the movement average is greater than the maximum threshold value, the correlation is taken by said UW correlation judgement circuit.

9. The receiver as claimed in claim 7, wherein when the movement average is smaller than the minimum threshold value, minimum threshold value is decreased.

10. The receiver as claimed in claim 7, wherein the two threshold values stored in said memory are made variable.

11. A receiver which detects data based on CDMA system by using a reception synchronization circuit for receiving a unique word transmitted in a predetermined digital pattern, said reception synchronization circuit comprising:

a detection circuit for detecting the received power of a received signal and outputting a movement average;

a UW correlation judgment circuit for detecting the unique word (hereinafter referred to as "UW") and taking a correlation between the unique word thus detected and a predetermined digital pattern; and a memory for storing two threshold values for the movement average, wherein after the two threshold values and the movement average are compared with each other, the received power is detected again when the movement average is larger than the minimum threshold value and is smaller than the maximum threshold value.

12. The receiver as claimed in claim 11, wherein when the movement average is greater than the maximum threshold value, the correlation is taken by said UW correlation judgement circuit.

13. The receiver as claimed in claim 11, wherein when the movement average is smaller than the minimum threshold value, the minimum threshold value is decreased.

14. The receiver as claimed in claim 11, wherein the two threshold values stored in said memory are made variable.

15. A reception synchronization method for receiving a unique word (hereinafter referred to as "UW") transmitted in a predetermined digital pattern comprising the steps of:

detecting the received power of a received signal;

calculating the mean square of the received power and outputting a movement average of the received power;

reading out from a memory the minimum threshold value and the maximum threshold value which are stored in the memory;

comparing the movement average with the minimum threshold value and the maximum threshold value;

detecting the UW when the movement average is larger than the minimum threshold value;

detecting again the received power when the movement average is larger than the minimum threshold value and is smaller than the maximum threshold value;

increasing the maximum threshold value when the received power detected again is greater than the maximum threshold value before increase; and detecting the UW for taking a correlation between the UW and the predetermined digital pattern.

16. The reception synchronization method as claimed in claim 15, wherein when the movement average is judged to be smaller than the minimum threshold value as a result of the comparison between the movement average and the minimum threshold value, the minimum threshold value is decreased to search a next received channel.

17. The reception synchronization method as claimed in claim 15, wherein when the movement average is judged to be larger than the minimum threshold value and smaller than the maximum threshold value as a result of the comparison of the movement average, the minimum threshold value and the maximum threshold value, the minimum threshold value is increased in order not to perform a correlation calculation between the received signal and the UW.

18. A digital communication system which establishes synchronization by using a reception synchronization method for receiving a unique word (hereinafter referred to as "UW") transmitted in a predetermined digital pattern, the reception synchronization method comprising the steps of:

detecting the received power of a received signal;

calculating the mean square of the received power and outputting a movement average of the received power;

reading out from a memory the minimum threshold value and the maximum threshold value which are stored in the memory;

comparing the movement average with the minimum threshold value and the maximum threshold value;

detecting the UW when the movement average is larger than the minimum threshold value;

detecting again the received power when the movement average is larger than the minimum threshold value and is smaller than the maximum threshold value;

increasing the maximum threshold value when the received power detected again is greater than the maximum threshold value before increase; and detecting the UW for taking a correlation between the UW and the predetermined digital pattern.

19. The digital communication system as claimed in claim 18, wherein when the movement average is judged to be smaller than the minimum threshold value as a result of the comparison between the movement average and the minimum threshold value, the minimum threshold value is decreased to search a next received channel.

20. The digital communication system as claimed in claim 18, wherein when the movement average is judged to be larger than the minimum threshold value and smaller than the maximum threshold value as a result of the comparison of the movement average, the minimum threshold value and the maximum threshold value, the minimum threshold value is increased in order not to perform a correlation calculation between the received signal and the UW.

* * * * *